United States Patent [19]
Pfisterer

[11] Patent Number: 5,392,431
[45] Date of Patent: Feb. 21, 1995

[54] TV PROJECTION LENS INCLUDING A GRADED INDEX ELEMENT

[76] Inventor: Richard N. Pfisterer, 12380 E. Horsehead Rd., Tucson, Ariz. 85749

[21] Appl. No.: 957,256

[22] Filed: Oct. 5, 1992
(Under 37 CFR 1.47)

[51] Int. Cl.⁶ .................................................. G02B 3/00
[52] U.S. Cl. ..................................... 359/653; 359/650; 359/764; 359/772; 359/773
[58] Field of Search ............... 359/652, 653, 771, 772, 359/773, 764, 650; 358/250

[56] References Cited

U.S. PATENT DOCUMENTS

| | | |
|---|---|---|
| 2,117,252 | 5/1938 | Lee . |
| 4,568,151 | 2/1986 | Mihara .......................... 359/773 |
| 4,715,693 | 12/1987 | Takase et al. .................. 359/773 |
| 4,810,070 | 7/1989 | Suda et al. . |
| 4,852,981 | 8/1989 | Suda . |
| 4,900,139 | 2/1990 | Kreitzer . |
| 4,906,079 | 3/1990 | Mihara et al. ................. 359/652 |
| 4,907,866 | 3/1990 | Kitagishi et al. . |
| 4,929,065 | 5/1990 | Hagerty et al. . |
| 5,029,994 | 7/1991 | Aoki .............................. 359/653 |
| 5,202,992 | 4/1993 | Banno et al. ................... 359/764 |

FOREIGN PATENT DOCUMENTS 0754620  8/1956  United Kingdom ............... 359/773

Primary Examiner—Edward K. Look
Assistant Examiner—Christopher Verdier
Attorney, Agent, or Firm—R. Russel Austin

[57] ABSTRACT

A projection TV lens (60) includes first (64), second (66), third (70), and fourth (72) element-groups counted in numerical order and arranged on a common optical axis (62). The first, third, and fourth groups each include at least one lens element. The first and third group has positive power and the fourth group has negative power. The second group includes a first lens element (67) having negative power and having a graded refractive index.

7 Claims, 4 Drawing Sheets

TV PROJECTION LENS INCLUDING A GRADED INDEX ELEMENT

TECHNICAL FIELD OF THE INVENTION

The present invention relates in general to projection lenses. It relates in particular to a TV projection lens including an optical element having a graded refractive index.

BACKGROUND OF THE INVENTION

A TV projection lens is generally required to have a large aperture for providing acceptable image brightness and a large field of view for providing a projection TV system which is relatively compact. It is generally preferred that such a lens have an aperture of about f/1.0 and a half-field angle of between about twenty degrees and thirty degrees.

A projection lens is generally not required to have a very high resolution, as a conventional TV image in itself has relatively poor resolution. A resolution standard for a TV projection lens is usually specified as a modulation transfer function (MTF) value. For conventional TV, for example, a modulation of about 0.7 at a spatial frequency of three lines (cycles) per millimeter (3 lines/mm) is usual. For high definition TV, an MTF value of 0.7 at 10 lines/mm is generally specified. By way of comparison, a good quality photographic objective may have an MTF of about 0.7 at about 30 lines/mm.

Although the resolution requirements for a TV projection lens may be relatively undemanding, the combination of large aperture and field angle requirements makes the design of such lenses a difficult task. As many as ten conventional spherical elements may be required to provide an acceptably corrected lens. The cost of such a lens would generally be too high to satisfy a manufacturer's cost goal for a complete projection TV system.

A common design approach which has been adopted for TV projection lenses is to employ a lens element or lens elements having at least one aspheric surface. This reduces the number of lens elements required for the lens, which can reduce cost and provide a more compact lens. Surfaces of the aspheric lens elements in such lenses may depart quite significantly from spherical and are thus not easily fabricated from glass blanks by conventional grinding and polishing methods. For this reason, as well as for cost reasons, they are generally fabricated from plastic. Aspheric plastic elements having complex surface curvatures may be fabricated, for example, by a methods including molding and diamond turning. Several examples of lenses including aspheric elements are described in U.S. Pat. No. 4,900,139.

While plastic lens elements in general may be convenient to produce, they have certain significant shortcomings. The most significant of theses shortcomings is a large variation of optical properties with temperature, compared to glass elements. Additionally, optical properties of plastic elements may also vary significantly with humidity, and plastic elements are relatively soft and easily scratched. Further, only a small range of refractive index values is available for optical plastics, the range of values being between about 1.45 and 1.6. Such values are generally considered low by lens designers. Restriction to such low refractive indices further complicates an already complicated optical design problem.

There is a need for a TV projection lens which is at least as cost effective and compact as lenses employing plastic aspheric elements, but which includes lens elements having only spherical or plane surfaces and preferably only lens elements made from optical glasses.

SUMMARY OF THE INVENTION

The present invention is directed to a compact projection lens which includes only lens elements having spherical or plane surfaces. A compact lens is achieved by employing, in the lens design, an optical element having a graded refractive index.

In a preferred embodiment, the invention comprises four element-groups. Each group includes one or more lens elements, arranged generally on a common optical axis. The groups are numbered the first, second, third and fourth, counting from an object side of the lens.

The first element-group has positive power. The second element-group includes first and second lens elements counted from the object side of the lens. The first lens element has a graded refractive index and has negative power. The second lens element has positive power. The third element-group has positive power, and the fourth element-group has negative power.

The first element of the second group preferably has a concave first surface and the graded refractive index is preferably axially graded such that refractive index decreases in an axial direction away from the object side of the lens.

An advantageous feature of the present invention is that, by employing one element having an axially graded refractive index, a 67.5 mm, f/1.0 lens having a half-field angle of about twenty degrees, and an MTF of about 0.7 at a spatial frequency of 3 lines/mm, may be realized in a lens having only five lens elements. By way of comparison, a prior art lens not employing a graded refractive index element may require seven lens elements, including one or more elements having at least one aspheric surface, to achieve comparable performance.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENTS

Figure 1:
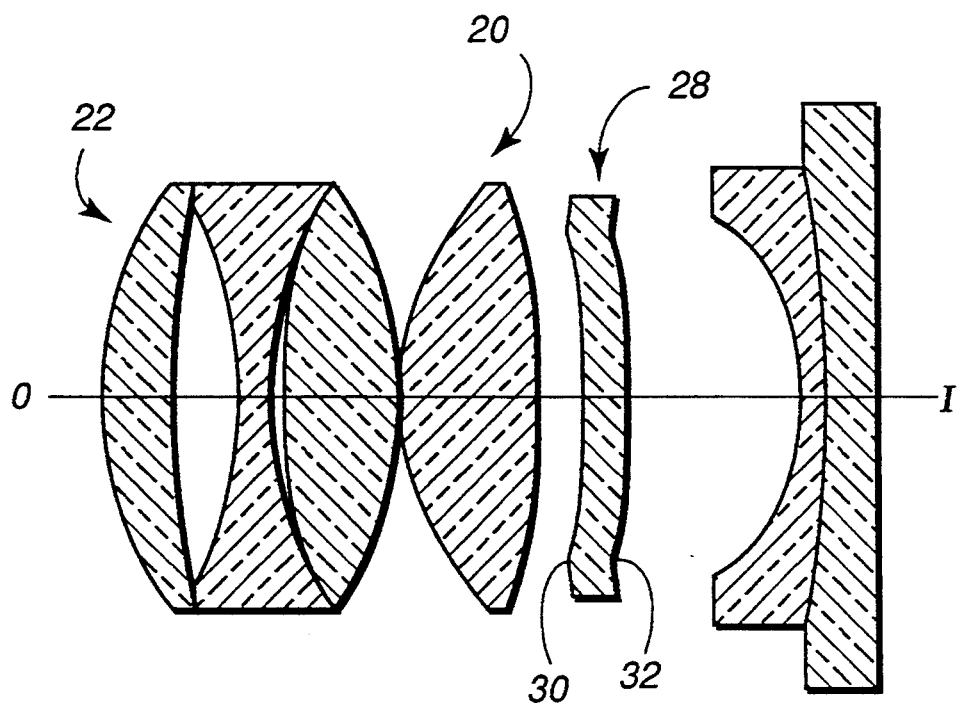
FIG. 1 schematically illustrates a prior art projection lens having a total of seven lens elements including three aspheric surfaces.

Before proceeding with a description of preferred embodiments of the present invention, it is useful in evaluating the advantages offered thereby to briefly review certain details of a prior art TV projection lens. Referring now to FIG. 1, a lens 20 including seven elements is depicted. Lens 20 corresponds to one of the less complex examples described in the above-referenced U.S. Pat. No. 4,900,139. Of the seven elements depicted, a first element 22 includes a surface 24 having an aspheric surface and a corrective element 28 having first and second surfaces 30 and 32, both of which are aspheric.

The optical design of the present invention was evolved by beginning with a conventional double-gauss type objective lens form. This form was chosen as a starting point as it is known to have inherently low coma and distortion. The principle of the double-gauss lens structure is described in detail in U.S. Pat. No. 2,117,252. Many high performance lenses, particularly lenses having a speed between about f/1.2 and f/2 and half-field angle between about fifteen and thirty degrees, are modifications or elaborations of this lens type.

Figure 2:
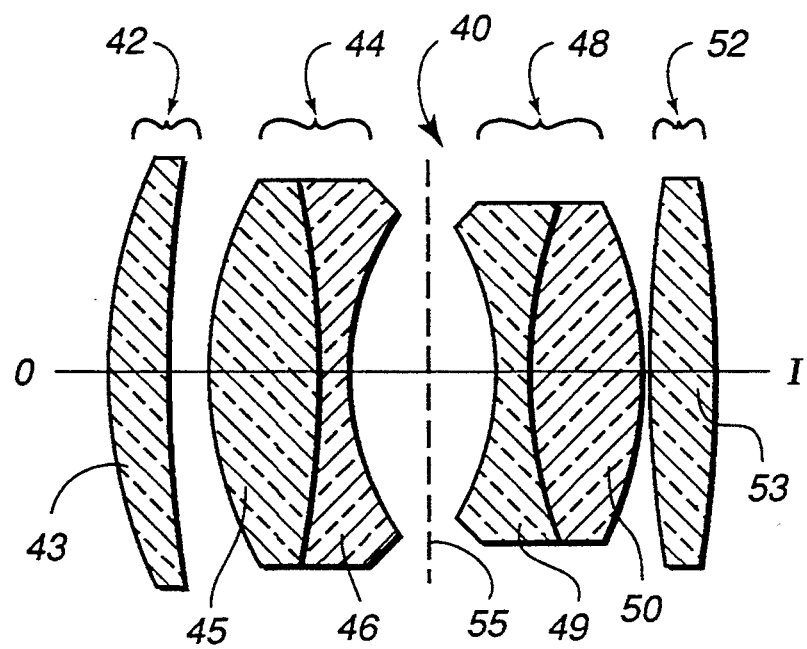
FIG. 2 schematically illustrates a prior art basic double-gauss type objective lens.

Referring now to FIG. 2, structure of a basic double-gauss lens form 40 is depicted.

The lens may be described as having an object side (the side from which light from an object is incident) designated by the letter "O" and an image side designated by the letter "I". Throughout this description and the claims appended hereto, element-groups, individual elements in a group, and surfaces of an individual element are numbered or counted from the object side, or front, of a lens. The term "lens element", as used herein, refers to a single optical component having two surfaces. The term "element-group" refers to a group of one or more lens elements which provide a specific optical function, such as providing positive (focussing) power, providing negative power, or providing correction of one or more lens aberrations. In element-groups including more than one lens element, elements may be physically separated (air spaced) or bonded together, with a transparent optical adhesive.

Continuing now with reference to FIG. 2, the arrangement of elements of double-gauss lens 40 is generally described as symmetrical, as it appears to be almost symmetric about an imaginary plane 55. Lens 40 comprises six lens elements arranged in four element-groups. Lens 40 includes a first element-group 42 including one lens element 43 having positive power. A second element-group 44 includes a first lens element 45 having positive power and a second lens element 46 having negative power. The elements are bonded together to form element-group 44. A third element-group 48 includes a first lens element 49 having negative power bonded to a second lens element 50 having positive power. A fourth element-group 52 includes one lens element 53 having positive power. In general, first and fourth element-groups 42 and 52 each provide positive focussing power. Second and third element-groups 44 and 48 each have zero or relatively little power and provide primarily correction of lens aberrations. Elements-groups 44 and 48 are often referred to as thick meniscus groups and are known to be effective in minimizing field curvature in a lens.

Generally, the basic form exemplified by lens 40 would be useful only for lenses having an aperture of f/1.8 or smaller. In order to achieve acceptable performance at larger apertures, such as f/1.2 or f/1.4, common modifications and elaborations of the double-gauss lens have included providing at least one additional lens element in groups 42 or 52, resulting in a lens of seven or more lens elements.

In the design of the present invention, it was determined that the first corrective element-group of a double-gauss type lens (group 44 of FIG. 2) could be eliminated, and that certain corrective functions of the eliminated element-group could be provided by substituting for the negative lens element in the second element-group (element 49 of FIG. 2) a negative lens element having a graded refractive index (GRIN). It was determined that most monochromatic corrective functions of the eliminated element-group could be provided by the graded refractive index lens element. Color correction was achieved by the remaining lens elements. In order to correct an increase in field curvature resulting from the elimination of a thick meniscus element-group, a field flattening lens element was added, which is usual in projection lens design. The resulting lens thus contained five lens-elements compared with the six lens-elements of the basic double-gauss lens, seven or more elements of larger aperture implementations of the double-gauss lens and seven or more elements of prior art projection lenses.

Figure 3:
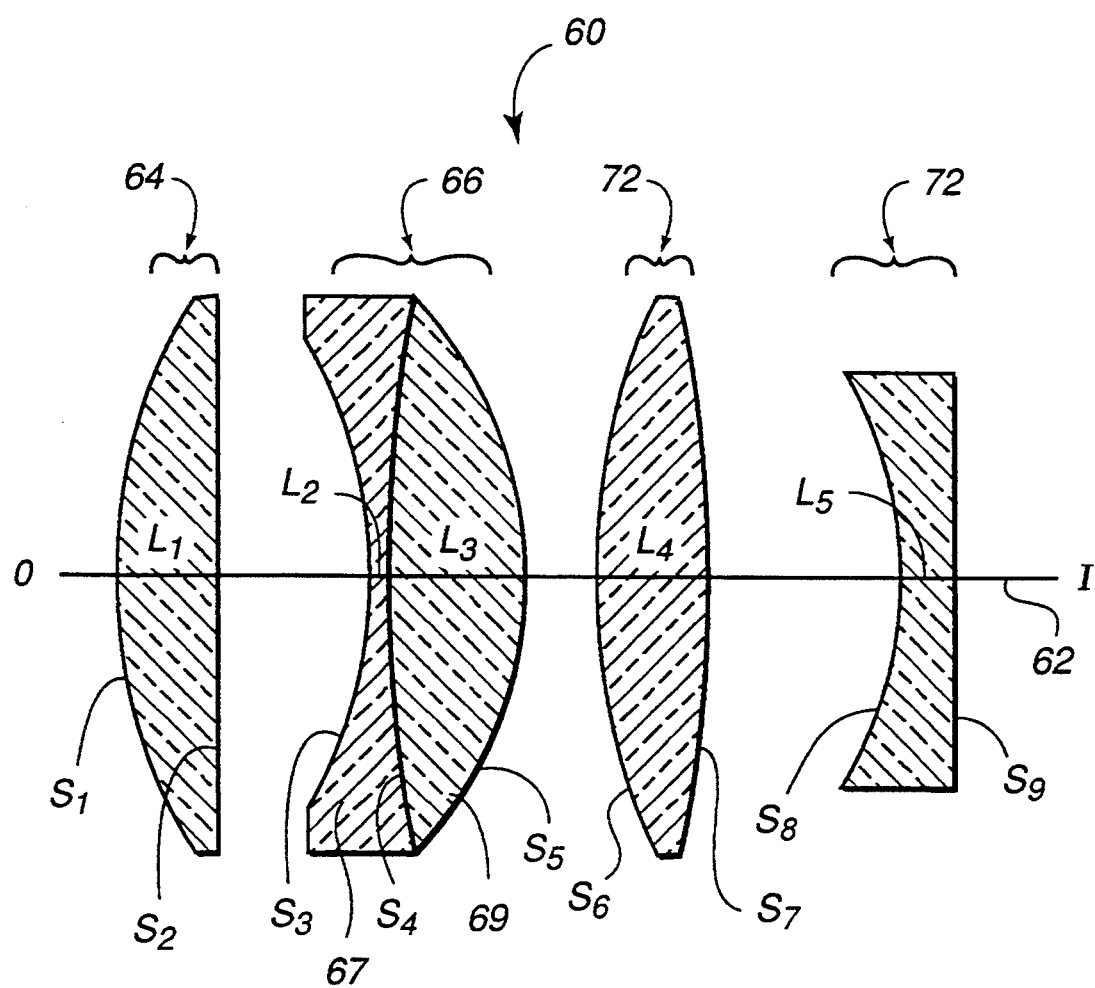
FIG. 3 schematically illustrates one preferred embodiment of the present invention having a total of five lens elements, including one element having a graded refractive index.

Referring now to FIG. 3, a lens 60 in accordance with the present invention includes five lens elements arranged on a common optical axis 62 in four element-groups. It will be evident to those familiar with the pertinent art that lens 60 bears little if any resemblance to the basic double-gauss form from which it was evolved, being simpler in element count and lacking symmetry.

In lens 60, a first element-group 64 has positive power and includes a single lens element. The lens element has first and second surfaces $S_1$ and $S_2$ respectively separated along axis 62 by a distance $L_1$. Surface $S_1$ is a convex surface. Surface $S_2$ is preferably a shallow convex surface or a plane surface.

A second element-group 66 is a bonded doublet. The doublet preferably has about zero power, but may have a relatively weak negative power.

Group 66 includes a first lens-element 67, which has negative power and a graded refractive index. The refractive index is preferably an axially graded refractive index, decreasing in an axial direction away from the first surface of the element, i.e., away from the object side of lens 60. A method for producing a lens element having an axially graded index is described in U.S. Pat. No. 4,929,065.

A second (homogenous index) lens element 69 of element-group 66 has positive power and two convex surfaces. Lens-elements 67 and 69 are bonded together to form the doublet which is defined by surfaces $S_3$, $S_4$, and $S_5$, separated axially by distances $L_2$ and $L_3$ respectively.

A third element-group 70 has positive power and includes a single element. The element has first and second convex surfaces $S_6$ and $S_7$ respectively, separated along axis 62 by a distance $L_4$.

A fourth element-group 72 has negative power and provides field flattening. It includes a single lens element having a concave surface $S_8$ and a plane surface $S_9$, separated axially by a distance $L_5$.

In a projection TV system, a cathode ray tube (CRT) including the subject matter to be projected would be located immediately adjacent plane surface $S_9$ of the field flattening group, i.e., the CRT would be located on what is termed the image side of lens 60 in the generally accepted description of an objective lens. A screen for receiving the projected image would be located on what is conventionally termed the object side of lens 60.

Those skilled in the relevant art will appreciate that for a simple compact lens it is preferable that first third and fourth element-groups 64, 70, and 72 respectively, each comprise only one lens element, as described above for lens 60. It may, however, be necessary or convenient in designing a higher performance lens, to include more than one lens element in the first, third, or fourth element-groups. In a lens providing a half-field angle of about thirty degrees, for example, it may be preferable to include in the first element-group, a first lens element having negative power and second and third lens elements having positive power. Generally, it may be assumed that any of the above-described modifications which have been made to equivalent element-groups of the basic double-gauss system may be effected in a lens in accordance with the present invention.

Continuing now with a discussion of GRIN lens element 67, a graded refractive index for an optical element may be conveniently specified in terms of a polynomial of the form $$n(\lambda,z) = n_0(\lambda) + n_1(\lambda)z + n_2(\lambda)z^2 + n_3(\lambda)z^3 + n_4(\lambda)z^4 \ldots \quad (1)$$

where z is a distance in millimeters along an optical axis measured from the first surface of the lens element in a direction away from the first surface, $\lambda$ is a wavelength in micrometers ($\mu$m), and $n_0$, $n_1$, $n_2$, $n_3$, $n_4$, etc. are coefficients which are a function of wavelength $\lambda$. Three such polynomials, each for a different value of $\lambda$, are preferably used to determine a dispersion gradient in addition to an index gradient. Values of $\lambda$ are preferably about 0.486 $\mu$m, 0.587 $\mu$m, and 0.656 $\mu$m, (the hydrogen "f" line, the helium "d" line and the hydrogen "c" line, respectively).

It will be evident to those familiar with the relevant art that refractive index gradients other than an axial gradient may be effective in a lens in accordance with the present invention. By way of example, the index gradient may be a spherical gradient wherein refractive index of a lens element may be in accordance with equation (1) at any point within the lens element which lies on a sphere having a radius z. Such a spherical refractive index gradient or other complex refractive index gradients, however, may be significantly more difficult to realize in practice than a linear refractive index gradient, and the cost of producing a lens having such a complex refractive index gradient may offset any physical or optical advantages it may provide.

It has been determined that a linearly graded refractive index substantially in accordance with a formula $$n(\lambda,z) = n_0(\lambda) + n_1(\lambda)z \quad (2)$$

i.e., a formula in which coefficients of second and higher order terms of equation (1) are assumed to be effectively zero, is effective in a projection lens according to the present invention. The value of z in equation (2) is a distance in millimeters measured along the optical axis from the first surface of the lens in direction away from the object side of the lens. Coefficient $n_0$ is a dimensionless quantity and $n_1$ is dimensioned in reciprocal millimeters.

One example of such a lens is specified in Table 1, wherein the refractive index of homogeneous elements is conventionally specified as an index $n_d$ and a V-value $V_d$ at about 0.587 $\mu$m. The refractive index of graded index element 67 (designated GRIN in Table 1) is in accordance with equation (2), and with Table 2 wherein coefficients $n_0$ and $n_1$ are specified for three values of $\lambda$. Such a refractive gradient may be realized, for example, in a GRIN material formed from glasses in the lead (Pb) family of optical glasses.

TABLE 1

| ELEMENT | SURFACE | SURFACE RADII (mm) | AXIAL DISTANCE BETWEEN SURFACES | $n_d$ | Vd |
|---|---|---|---|---|---|
| $L_1$ | $S_1$ | 72.413 | | 1.713 | 53.8 |
| | | | 13.000 | | |
| | $S_2$ | 4738.203 | | | |
| | | | 21.518 | | |
| $L_2$ | $S_3$ | −55.467 | | GRIN | |
| | | | 2.550 | | |
| | $S_4$ | 183.097 | | | |
| $L_3$ | | | 17.541 | 1.713 | 53.8 |
| | $S_5$ | −56.759 | | | |
| | | | 10.420 | | |
| | $S_6$ | 95.303 | | | |
| $L_4$ | | | 13.704 | 1.713 | 53.8 |
| | $S_7$ | −201.132 | | | |
| | | | 27.516 | | |
| | $S_8$ | −46.642 | | | |
| $L_5$ | | | | 1.620 | 36.4 |
| | $S_9$ INFINITY | | | | |

TABLE 2

| $\lambda$ | $n_0$ | $n_1$ |
|---|---|---|
| 0.656 | 1.722582 | −0.02053 |
| 0.587 | 1.730073 | −0.02100 |
| 0.486 | 1.748345 | −0.02220 |

The lens specified in Tables 1 and 2 is an f/1.0 lens having an effective focal length (EFL) of 67.5 mm and a half-field angle of twenty degrees. CRT diagonal is 49.1 mm. An aperture stop is on $S_2$.

Figure 4:
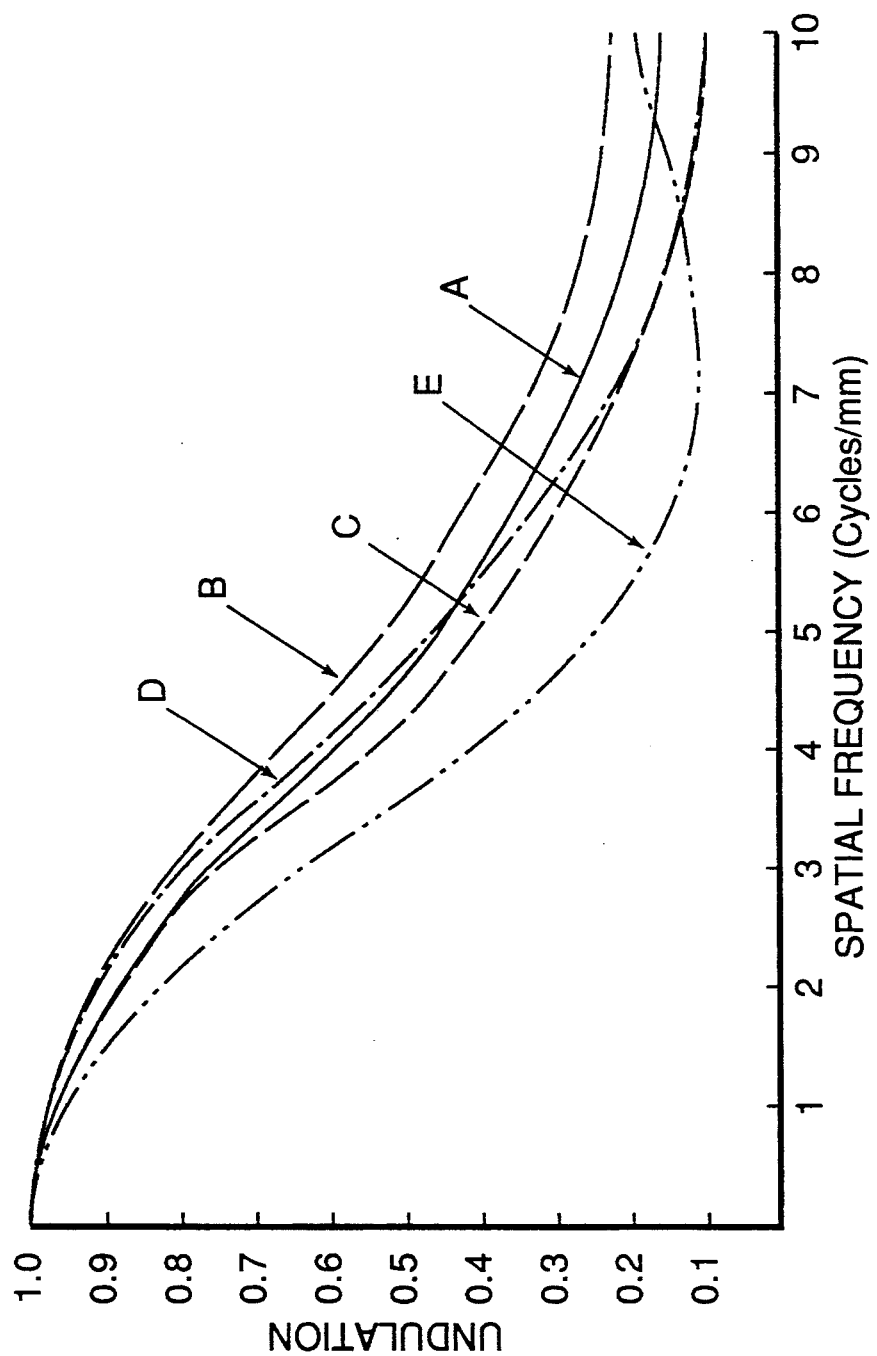
FIG. 4 is a graph illustrating computed modulation transfer function at various field heights for a lens in accordance with the embodiment of FIG. 3.
Figure 5B:
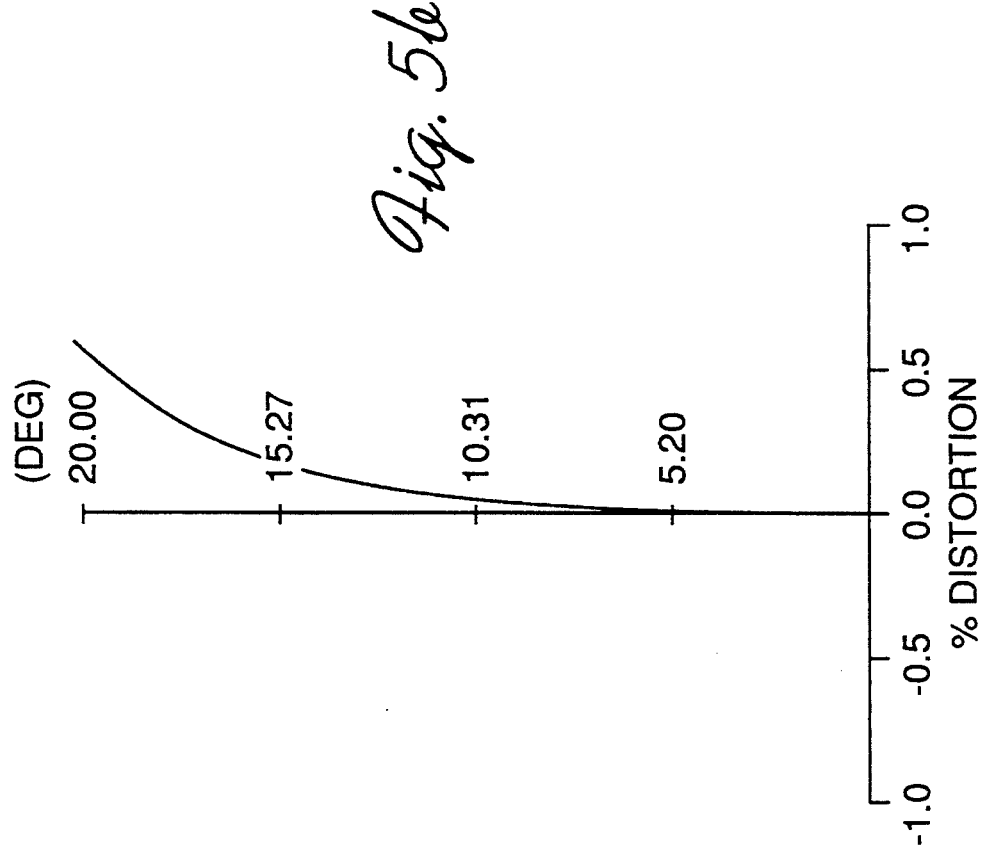
FIGS. 5a and 5b are graphs illustrating computed aberrations of the lens of FIG. 3.
Figure 5A:
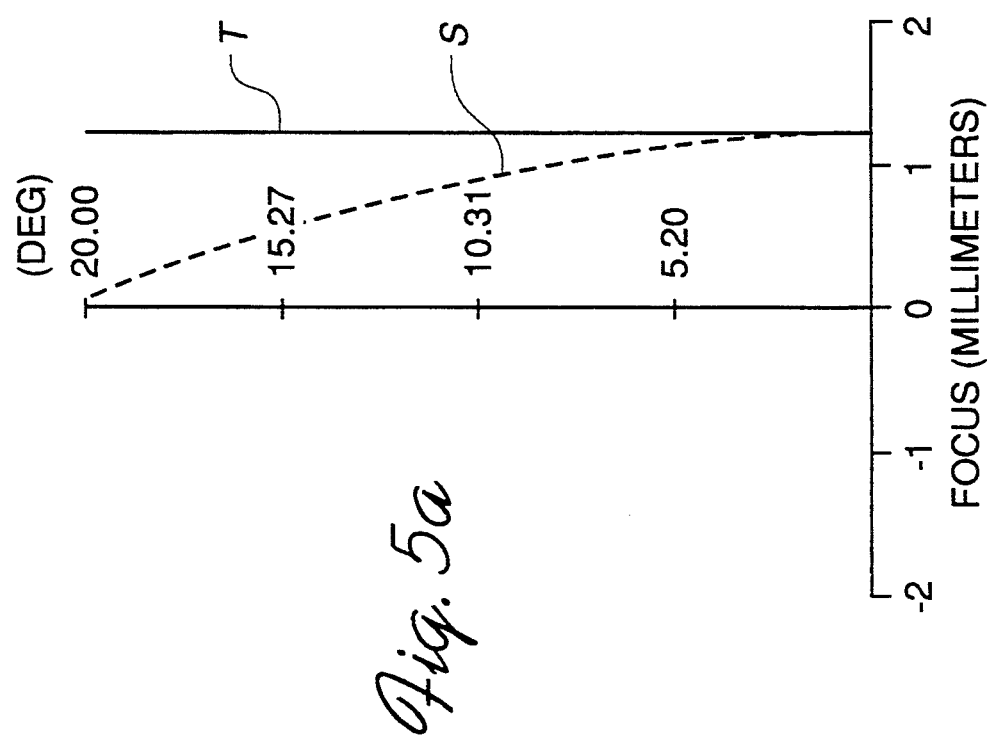

Computed performance of the lens of Tables 1 and 2 is illustrated in FIGS. 4 and 5a–b. In FIG. 4, axial MTF is shown is shown by curve A, tangential MTF at 14.00 degrees (0.7 field), and 20.00 degrees (1.0 field), is shown by curves B and C, respectively, and sagittal MTF at 14.00 degrees and 20.00 degrees is shown by curves D and E respectively. It can be seen that the lens substantially meets an MTF specification of 0.7 at a spatial frequency of 3 lines/mm.

FIGS. 5a and 5b show, respectively, astigmatic field curves and distortion performance. As is usual in the art, field has been flattened (Curve T) in the tangential orientation at the expense of some field curvature (Curve S) in the sagittal orientation.

In summary, a compact projection TV lens has been described which may have as few as five lens elements, none of which requires an aspheric surface. The lens has been described in principle and in terms of a preferred and other embodiments. Those skilled in the relevant art will appreciate that embodiments other than those described and depicted may be possible without departing from the principle and spirit of the invention defined by the appended claims.

INDUSTRIAL APPLICATION

The present invention is useful in building projection TV systems. The lens includes less lens elements than prior art lenses having about the same optical specification and performance. As such, the lens may be useful in reducing cost or compactness of a projection TV system. The lens does not require any lens elements which have surfaces other than plane or spherical, or any elements which are made from a material other than optical glass. Generation, polishing, testing and coating of the lens elements is thus possible using long established and well known optical fabrication techniques.

What is claimed is:

1. A lens, comprising:
   first, second, third, and fourth element-groups, said element-groups counted from an object side of the lens, and arranged generally on a common optical axis;
   said first and third element-groups each having positive power and each including at least one lens element;
   said fourth element-group having negative power and including at least one lens element; and
   said second element-group including first and second lens elements counted from the object side of the lens, said first lens element having first and second concave surfaces and having a graded refractive index, said graded refractive index axially graded and decreasing in an axial direction away from the object side of the lens, and said second lens element having positive power.

2. The lens of claim 1 wherein said first and second lens elements of said second group are bonded together to form a doublet.

3. The lens of claim 2 wherein said first third and fourth element-groups each include only one element.

4. The lens of claim 3 wherein said graded refractive index is substantially in accordance with a formula $$n(\lambda,z) = n_0(\lambda) + n_1(\lambda)z$$

and a table:

| $\lambda$ | $n_0$ | $n_1$ |
|---|---|---|
| 0.656 | 1.722582 | −0.02053 |
| 0.587 | 1.730073 | −0.02100 |
| 0.486 | 1.748345 | −0.02220 | where z is a distance in millimeters along said optical axis measured from the first surface of said first element in a direction away from the object side of the lens, $\lambda$ is a wavelength in micrometers, $n_0$ is a dimensionless quantity, and $n_1$ is dimensioned in reciprocal millimeters.

5. A lens, comprising:
   first, second, third, fourth, and fifth lens elements each having first and second surfaces, said elements and surfaces counted from an object side of the lens;
   said first lens element including a first surface having a first positive radius of curvature, and a second surface having a second positive radius of curvature, said second radius of curvature greater than said first radius of curvature;
   said fourth lens element including a first surface having a positive radius of curvature and a second surface having a negative radius of curvature;
   said fifth lens element including a first surface having a negative radius of curvature and a second surface having an infinite radius of curvature;
   said second lens element including a first surface having a negative radius of curvature and a second surface having a positive radius of curvature and having an axially graded refractive index;
   said third lens element including a first surface having a positive radius curvature equal to the radius of curvature of said second surface of second element, and a second surface having a negative radius of curvature; and
   said second surface of said second lens element and said first surface of said third lens element being bonded together.

6. The lens of claim 5 wherein said axially graded refractive index is substantially in accordance with a formula $$n(\lambda,z) = n_0(\lambda) + n_1(\lambda)z$$

and a table:

| $\lambda$ | $n_0$ | $n_1$ |
|---|---|---|
| 0.656 | 1.722582 | −0.02053 |
| 0.587 | 1.730073 | −0.02100 |
| 0.486 | 1.748345 | −0.02220 | where z is a distance in millimeters along said optical axis measured from the front surface of said first element in a direction away from the object side of the lens, $\lambda$ is a wavelength in micrometers, $n_o$ is a dimensionless quantity, and $n_1$ is dimensioned in reciprocal millimeters.

7. The lens of claim 6 wherein said first, third and fourth elements each have a refractive index of about 1.713 and at a wavelength of about 0.5876 micrometers and a V-number of about 53.8, and said fifth element has a refractive index of about 1.620 at a wavelength of about 0.5876 micrometers and a V-value of about 36.4.

* * * * *